(12) United States Patent
Bailey

(10) Patent No.: US 6,677,962 B1
(45) Date of Patent: Jan. 13, 2004

(54) METHODS AND SYSTEMS FOR MANIPULATING USER INTERFACE CONTROLS

(75) Inventor: Richard St. Clair Bailey, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 407 days.

(21) Appl. No.: 09/603,846

(22) Filed: Jun. 26, 2000

(51) Int. Cl.$^7$ ................................................. G09G 5/00
(52) U.S. Cl. ........................ 345/744; 345/762; 345/765
(58) Field of Search ........................ 345/700, 744–747, 345/762, 764, 765, 810, 835, 840, 866

(56) References Cited

U.S. PATENT DOCUMENTS

| | | | | |
|---|---|---|---|---|
| 5,371,844 A | * | 12/1994 | Andrew et al. | 345/747 |
| 5,793,368 A | * | 8/1998 | Beer | 345/747 |
| 5,905,492 A | * | 5/1999 | Straub et al. | 345/744 |
| 5,959,624 A | * | 9/1999 | Johnston et al. | 345/746 |
| 6,188,399 B1 | * | 2/2001 | Voas et al. | 345/723 |
| 6,392,671 B1 | * | 5/2002 | Glaser | 345/765 |
| 6,590,590 B1 | * | 7/2003 | Wen et al. | 345/764 |

FOREIGN PATENT DOCUMENTS

| | | | |
|---|---|---|---|
| KR | WO 02/32032 A2 | * | 4/2002 |

OTHER PUBLICATIONS

Hotbar.com Launches Web Site Providing Free Software Enhancements to Web Browsers (PR Newswire; New York; Dec. 6, 1999).*

NeoPlanet Version 2.0 Launches With Intelligent Browsing for Easier, More Personalized Net Navigation (Business Wire; New York; Nov. 9, 1998).*

* cited by examiner

*Primary Examiner*—Sy D. Luu
(74) *Attorney, Agent, or Firm*—Lee & Hayes, PLLC

(57) ABSTRACT

The described embodiments present methods and systems for manipulating user interface (UI) controls after the controls have been designed by a control designer. Flexibility is provided through an inventive architecture that employs style class objects that are programmed or programmable to manipulate the appearance and/or behavior of the controls. Various themes can also be employed to manipulate the appearance of controls across the system in a uniform, standardized manner. Manipulation of the controls can thus take place at run time and on a system wide basis, e.g. across multiple applications. The inventive systems and methods can be employed in the context of third parties such as original equipment manufacturers (OEMs) to provide the ability to "brand" products, e.g. consumer embedded products.

98 Claims, 8 Drawing Sheets

METHODS AND SYSTEMS FOR MANIPULATING USER INTERFACE CONTROLS

TECHNICAL FIELD

This invention relates generally to user interfaces and, more particularly, to methods and systems for manipulating user interfaces or controls that comprise user interfaces.

BACKGROUND

A "control" is a basic element of a computerized user interface and allows a user to interact with an application program, e.g. by adjusting the volume of a CD player application or by modifying the equalizer settings of a car or home stereo. Controls come in many shapes and sizes and, to date, have been traditionally designed by a control developer who decides what the control is going to look like, and how the control is to behave.(As an example, one type of control is a slider that can be engaged through a user input device, such as a mouse, and manipulated to adjust the operational parameters of a particular device. Another type of control is a push button that can be clicked on by a mouse to make a particular selection.

Control developers typically design their controls or control types to have a predefined appearance and behavior. After a control is designed by a developer, it is typically compiled, linked and shipped in a binary form. After such processing, the appearance and behavior of controls have not traditionally been manipulable, e.g. on a system-wide basis. That is, once the control developer decides on and implements a particular style and function of control, that style and function is essentially set for the system and is not capable of being changed.

There are systems in place in which application developers can develop their own sets of controls to execute in connection with their own defined applications. To this extent, it can be said that these types of controls vary in their appearance and behavior as between different applications. If a computer system executes these different applications, the system's users will be exposed to the different controls for each of the different applications that they execute. Because the controls are all different in appearance and behavior, there is no consistency between the user interfaces. This can very easily give rise to user confusion and degrade the user's experience. As an example, consider a simple slider control. One application developer might design a slider control to have a very different appearance and function than another application developer's slider control. Hence, when a user executes the applications developed by these developers, they are presented with very different versions of what should be easily understandable, standardized controls.

It would be highly desirable to be able to manipulate the appearance and, in some instances, the behavior of controls after the controls have been developed by a control developer so that the controls are implemented on a system-wide basis. This way, any applications that execute on a system and use a particular type of control would use the same appearance-modified or behavior-modified control.

For example, consider the case of an original equipment manufacturer (OEM). OEMs, such as hardware manufacturers, might manufacture a piece of hardware that utilizes a graphic user interface such as a slider or various push buttons. The software that is utilized or embedded in the hardware system might only provide controls having a predefined appearance that is considered by the OEM to be very bland. What the OEM really desires is a way to uniquely position their product so as to distinguish their product from other OEMs. One way to do this might be to manipulate the controls or UI so that the controls or UI identify the OEM as the originator of the product. To date, however, there has been no effective way to do this other than, perhaps to specially program the OEM's products to have a unique interface, including appearance and behavior.

This invention arose out of concerns associated with providing systems and methods for UI control manipulation, particularly after the control has been initially designed by a control designer.

SUMMARY

The described embodiments present methods and systems for manipulating user interface (UI) controls after the control has been designed by a control designer. Flexibility is provided through an architecture that enables controls to be manipulated or branded after they are developed. Advantageously, manipulation takes place on a system-wide basis so that different applications that utilize a common control present the same appearance-manipulated or behavior-manipulated control to the user. One particularly advantageous application of the described embodiments provides original equipment manufacturers (OEMs) the ability to brand their products, e.g. consumer embedded products, with a distinctive and identifying brand through the use of unique controls.

In the described inventive approach, the notion of a style class or style class object is introduced as a mechanism by which individuals other than the control developer, e.g. OEMs, can manipulate the appearance and behavior of a control after it has been developed by the control developer.

A style class object, in the described embodiment, is defined as a programming object that supports an interface that is defined by a control developer for a particular control. The interface provides all of the function calls that are necessary for imparting functionality to the particular control. Style class objects can be written or defined by third parties other than control developers, and essentially define the unique appearance of the control, subject to supporting the interface that was originally defined by the control developer.

Style class objects are utilized in connection with an inventive architecture that promotes flexibility in control appearance and behavior. In an exemplary architecture, different control classes are defined, each of which represents a particular type of control, e.g. a slider control class, a push button control class, and the like. Each control can have multiple styles associated with it. A style associated with a control class uniquely defines the type of control that is ultimately displayed (e.g. horizontal sliders and vertical sliders are both different styles of a control defined by a slider control class).

In the described embodiment, data that defines each control class is kept in a location that organizes the controls by control class. An exemplary location is a system registry where the control classes are organized by class IDs (CLSIDs) that are uniquely associated with each control. For each CLSID, there are associated styles that can be flagged for the particular control. The style of a control and its ultimate layout or position within a UI is defined by a control developer when the control is initially developed. Also in the system registry is data that references one or more style class objects. In the described embodiment, this data is embodied as class IDs (CLSIDs) for each of the style class objects.

When a control having a particular style is created, code executing on the system consults the system registry and locates the control class and style that is associated with the particular control. In addition, the code locates, for the particular style, the CLSID of a style class object that has been defined to control the appearance and behavior of the control. The style class object is instantiated and all function calls that are generated by a user are now made to the instantiated style class object. The style class object contains code that enables the control to be rendered and presented to the user in a unique way. Having style class objects provides a first level of indirection that enables uniquely designed controls to be presented to a user.

In another embodiment, the concept of a theme is introduced and is implemented by a second level of indirection.

A theme is essentially a mechanism that allows the overall appearance of the user interface to be changed. In the described embodiment, a theme is embodied by a registry entry that defines a "current theme". A theme is essentially a collection of related appearances for all of the controls in the system. The system discovers that a theme has been set when it attempts to render one or more controls for a UI. Once the theme is ascertained, a particular style that has been set is located and a CLSID associated with a style class object is used to instantiate the style class object subject to the theme that is the "current theme".

The overall appearance of system-wide controls can be changed by simply changing the current theme and then informing the system that the current theme has changed. The system then consults the registry to ascertain the new theme, the CLSID of the associated control, the style of the control class and a CLSID of an associated style class object that is associated with that style. The style class object is then instantiated and the control is rendered as described above.

DETAILED DESCRIPTION

Overview

The described embodiments present methods and systems for manipulating user interface (UI) controls after the control has been originally designed by a control designer or developer. Flexibility is provided through an architecture that enables controls to be manipulated or "branded" after they are developed. Advantageously, manipulation takes place on a system-wide basis so that different applications that utilize a common control present the same appearance-manipulated and/or behavior-manipulated control to the user. Thus, the unique controls are standardized in appearance and/or behavior, even when rendered across multiple applications. One particularly advantageous application of the described embodiments provides original equipment manufacturers (OEMs) with the ability to brand their products, e.g. consumer embedded products, with a distinctive and identifying brand and/or appearance through the use of unique controls. The described architecture is particularly advantageous in that it permits control manipulation to take place at run time.

It will be appreciated that the principles described herein have applicability in any computing system that utilizes a user interface having controls. Examples of such computing systems include, without limitation, those that are employed in embedded devices, consumer devices, and the like.

Exemplary Computing System

Figure 1:
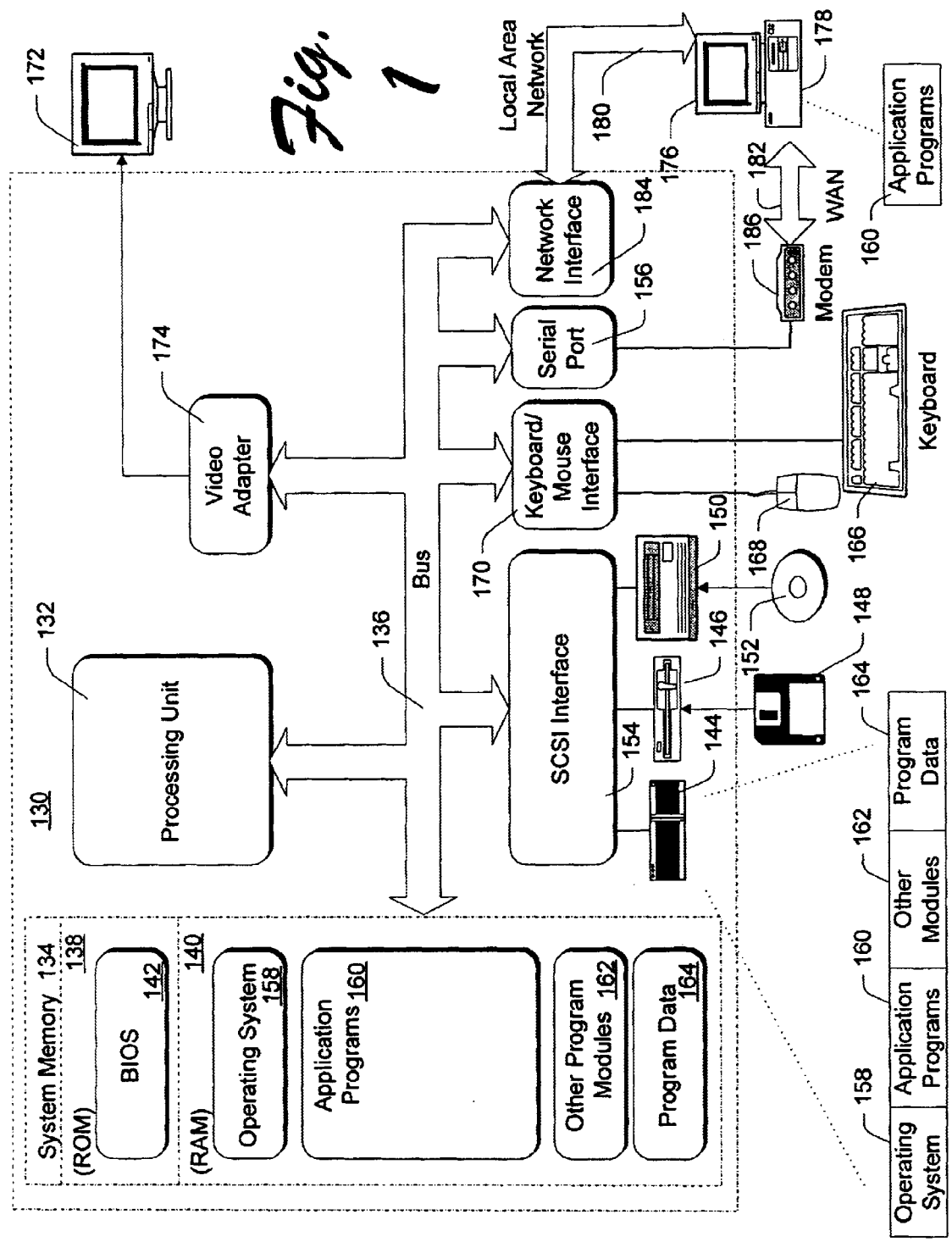
FIG. 1 is a high level block diagram of an exemplary computing system that can be utilized in accordance with the inventive principles described herein.

FIG. 1 shows but one example of a computing system in which the principles described herein can be employed. It will be appreciated that this constitutes but one example and is not intended to limit application of the inventive principles to the specific hardware system that is shown. Accordingly, other computing systems, including the ones mentioned above, can be employed. Those computing systems might, for example, employ components that are in addition to or different from those that are described below. Typically, an exemplary computing system will include one or more processors, computer-readable media of some type, one or more user input mechanisms (i.e. mouse, touch screen etc.), and one or more applications that are executable on the processors.

Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 4. The logical connections depicted in FIG. 4 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Architectural Overview

Figure 2:
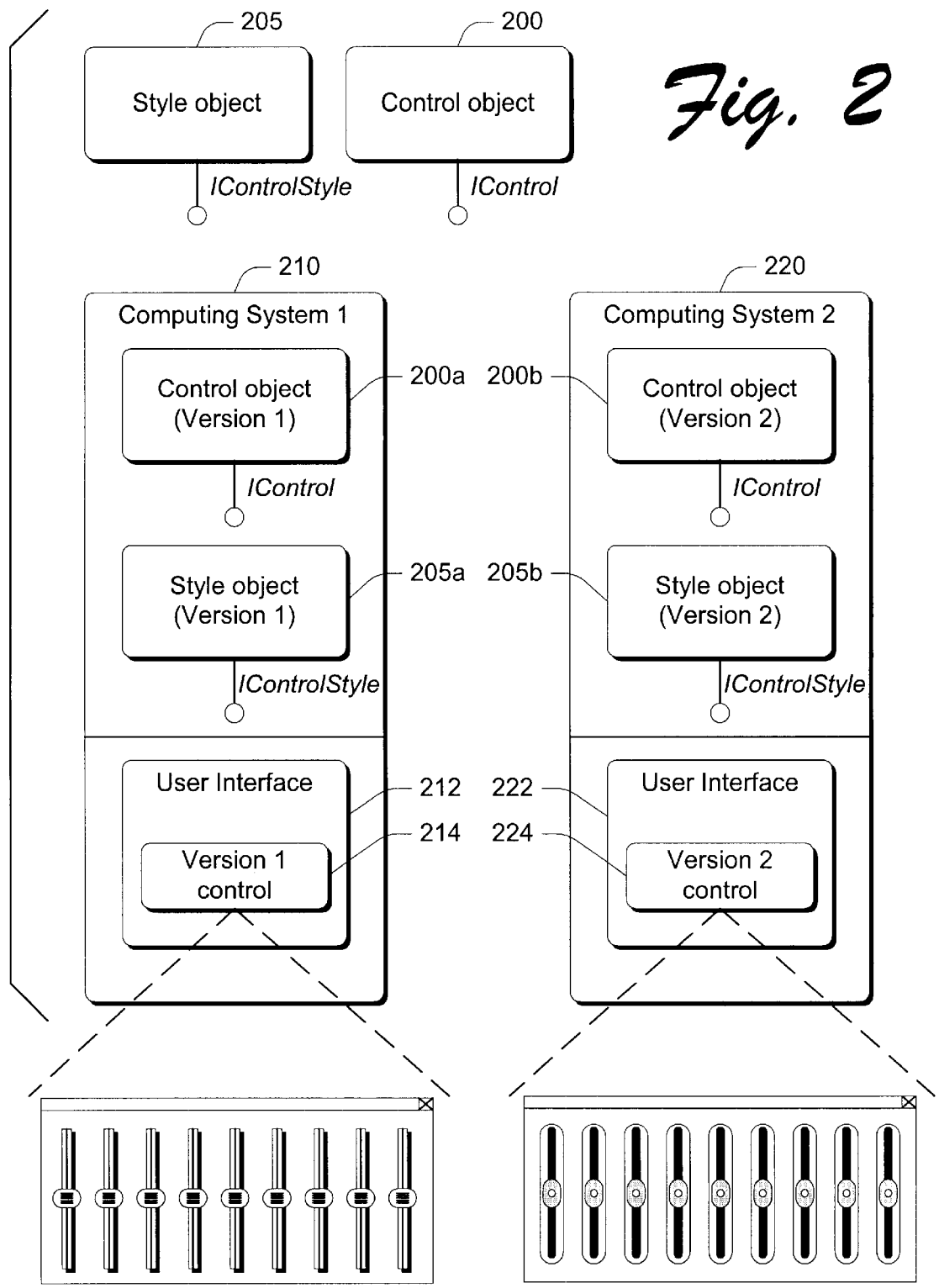
FIG. 2 is a block diagram that illustrates both architectural aspects and operational aspects of one described embodiment.

FIG. 2 shows an exemplary architectural overview that is useful in understanding various inventive concepts. In the illustrated example, a control object 200 is provided and represents an object that has been defined by a control developer. For each control in a particular computing system, there will be a control object that contains data and methods that define aspects of the behavior for the control. For example, for a slider control, there will be a corresponding slider control object that, once instantiated, contains data and methods that provide functionality for the slider control, as will be understood by those of skill in the art.

In addition, a style object 205 is provided that represents an object that has also been defined by the control developer. For each control object in a particular computing system, there will be an associated style object that contains data and methods that define aspects of the appearance for a respective control object. For example, the slider control object that provides functionality for the slider control has an associated slider style object that provides the appearance aspects for the slider control. The control developer develops a control object and a style object for each of the controls that might be used in a particular application.

When a third party, such as an OEM, wishes to manipulate the appearance or behavior of a control that has been developed by a control developer, they do so by defining, or re-defining, other programming objects (e.g., the style objects) that support the interface of the programming object defined by the control developer. These other programming objects, when executed on computing systems, can provide uniquely appearing and/or behaving controls. A particular advantage of implementing a control with both a control object and a style object is that when an OEM wishes to change the appearance of an existing UI, the OEM can simply replace the style object used by the control. This avoids the possibility of rendering a particular application inoperable by replacing an entire control object.

In this particular example, control object 200 and style object 205 constitute programming objects in the form of COM objects (Component Object Model) which is a well-known Microsoft programming object. Other programming objects can, of course, be utilized. In the illustrated example, control object 200 has an IControl interface that defines all of the function calls or methods that are supported by object 200. Similarly, style object 205 has an IControlStyle interface that defines all of the function calls or methods that are supported by object 205. That is, when a control developer initially develops a control, they also define an interface that is associated with the control.

FIG. 2 also shows two exemplary computing systems 210, 220. In this example, assume that computing systems 210, 220 are similar computing systems (e.g. an embedded consumer product such as a CD player) and originate from different original equipment manufacturers (OEMs). Each computing system comprises different versions of control object 200 in this case, computing system 210 includes control object 200a and computing system 220 includes control object 200b. Each of the control objects 200a, 200b supports the IControl interface that is defined for control object 200. That is, each of the different control object versions includes all of the function calls or methods that were defined by the control developer for control object 200.

Each computing system 210, 220 also has a different version of style object 205. Computing system 210 includes a style object 205a and computing system 220 includes a style object 205b. Each computing system 210, 220 includes a respective user interface 212, 222. The user interfaces present controls 214, 224 that are rendered by respective control objects 200a, 200b. Control object 200a uses style object 205a to render user interface controls 214 and control object 200b user style object 205b to render user interface controls 224. In this particular example, each computing system 210, 220 has a different control appearance in the form of a collection of vertical sliders. That is, each control is similar in style in that it is a collection of vertical sliders. Each control, however, is different and distinguishable from the other control because of its unique appearance. Each control is unique in appearance due to the differing versions of style objects 205a, 205b.

In the illustrated example, the control object 200 that is designed by the control developer is designed to be a collection of vertical sliders. The control developer in this case has made a decision concerning the style of the control. The behavior of the control selected by the control developer can be defined by the IControl interface. When a new version of the control object is defined (e.g. by control objects 200a, 200b), each contains data and methods that modify the behavior of the control. When a new version of the style object is defined (e.g., by style objects 205a, 205b), each contains data and methods that modify the appearance of the control.

As an example, consider the exemplary controls that are shown just beneath the respective computing devices 210, 220. The leftmost control 214 comprises a collection of vertical sliders that has a very different appearance than the collection of vertical sliders that comprises rightmost control 224.

It will be appreciated that each of the computing systems 210, 220 can have multiple different applications that it can execute. Each of the different applications can employ the use of a UI that contains one or more controls. Advantageously, the different versions of the control objects (e.g. control objects 200a, 200b) and style objects (e.g. style objects 205a, 205b) are organized in such a way so that the controls, if modified in behavior and/or appearance, are modified in a standardized way across all of the applications that might execute on the computing system. That is, if a user is exposed to a vertical slider in one application, then in a different application, the user is exposed to a slider that is the same in appearance and behavior as the first slider. In this way, the user experience is standardized across different applications that can be executing on the system.

Figure 2A:
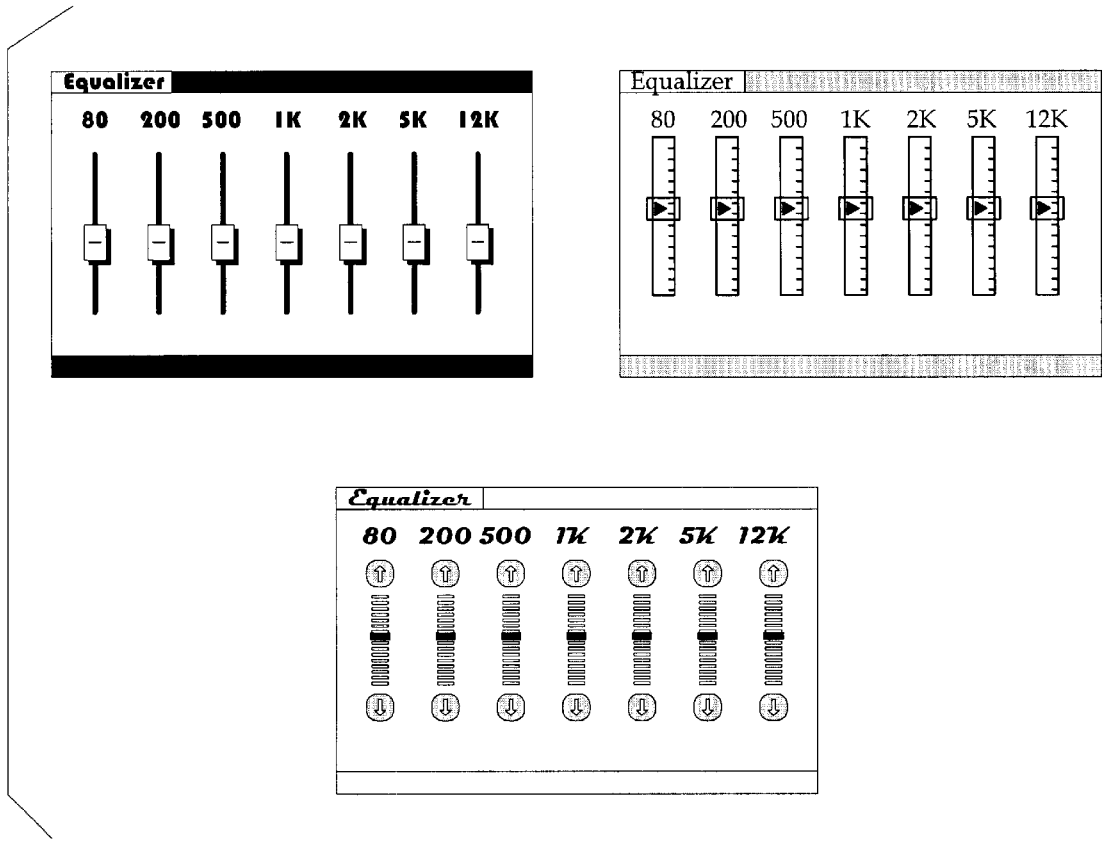
FIG. 2A is an illustration of three exemplary UI controls that have been modified in appearance in accordance with the described embodiment.

As a further example of how the controls can be manipulated to have a different appearance and/or function, consider FIG. 2A which shows three examples of a different equalizer UI that might be presented in connection with a car or home stereo. Each of the equalizer UIs is rendered by a control object version (such as control objects 200a, 200b) and by a style object version (such as style objects 205a, 205b) that supports an interface of a control object and style object that were designed by a control designer. The control object and style object versions have been utilized, however, to effect a change in the appearance and/or behavior of the UI. Thus, while each of the individual equalizers is similar in that each contains a number of vertical sliders, the appearance of the equalizers is sufficiently different so as to serve as a basis for distinguishing the stereo product in which it is incorporated.

Exemplary Organization

Figure 3:
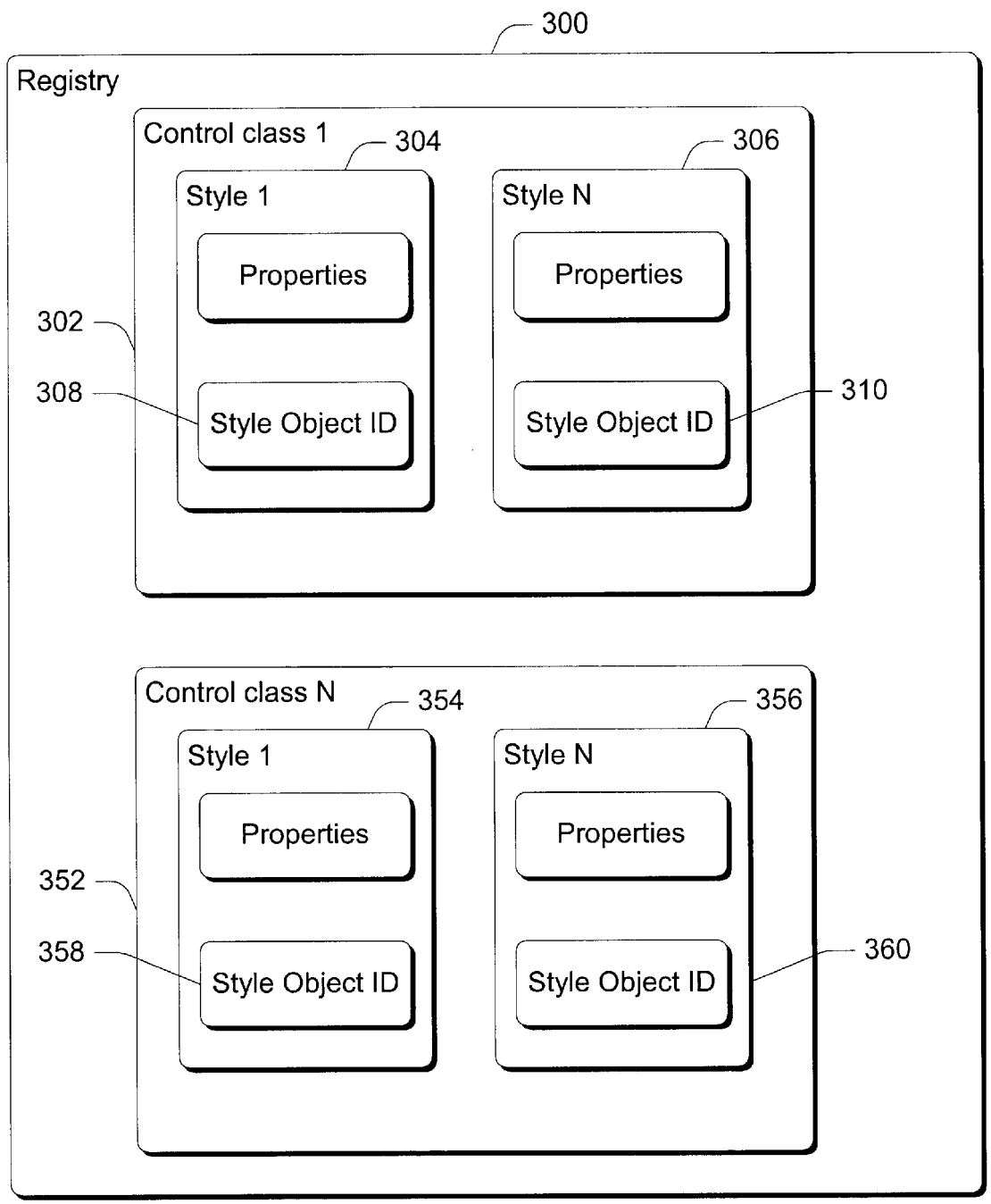
FIG. 3 is a high level block diagram of one exemplary organization in accordance with one described embodiment.

FIG. 3 illustrates but one exemplary organization that can be utilized to implement the presently-described embodiment. The organization illustrated by FIG. 3 enables third parties to manipulate the appearance and/or behavior of a control that is designed by a control designer as described above. The manipulation can advantageously take place at runtime.

In effect, the organization of FIG. 3 enables software code that is provided by the third parties to be utilized when a particular control is rendered by a computer system. Specifically, the organization of FIG. 3 is desirably resident on the computer system so that when a control is rendered, software code that is provided by the third parties can be utilized to present the controls that have been manipulated by the third party.

As an example, consider again an OEM. Assume that the OEM manufactures and distributes an embedded consumer product in the form of a stereo with CD, radio, and tape capabilities. Assume also that the stereo includes a user interface with a number of different controls that can be displayed for volume control, equalizer control, balance control, CD (radio station) selection control and the like. Assume also that the software that is incorporated into the product, such as the operating system that enables display of the user interface, is manufactured by another company such as Microsoft. Microsoft may manufacture such operating systems and distribute them to many different OEMs. The OEMs would like to be able to distinguish their products from those originating from other OEMS. One way of doing this is to provide a unique UI and controls that are different from every other OEMs controls. The organization of FIG. 3 presents but one way of providing an on-board mechanism that can allow third parties, such as OEMs to manipulate the appearance and behavior of controls after they have been developed by the control developer. FIG. 2A shows but one example of how this might look when, for example, UI controls for an equalizer have been modified by three different parties.

In the illustrated example, each computer system (such as computer systems 210, 220 in FIG. 2) has a registry or registration database 300. Within the registry, certain information pertaining to the controls of the computer system is maintained. In the illustrated example, each control (e.g. a slider, a push button, a check box, an edit box etc.) is represented by a control class. Each control class is identified by a unique number known as a class ID or CLSID. The CLSIDs of all of the control classes are maintained in the registry in the form of various registry keys. In the illustrated example, two exemplary control classes 302, 352 are shown. Control class 302 might be associated with a slider control, while control class 352 might be associated with a push button control.

Each control class is capable of having one or more styles associated with it. The styles are maintained in the registry in the form of registry keys. Each style defines a particular type of control for the control class—it represents a predefined appearance for a control class. As an example, a slider control might have two styles—horizontal and vertical. Horizontal sliders look and behave one way, while vertical sliders look and behave another. The style as well as behavior of the slider is typically defined by the control developer. For example, in some applications a control developer may provide for only vertical sliders by defining the particular style of the control class to be associated only with vertical sliders. This provides for a degree of consistency. In the illustrated example, control class 302 includes styles 304, 306, and control class 352 includes styles 354, 356.

Each style has properties that are associated with it. These properties can define how the particular style of control is to behave and appear. In addition, a plurality of style object IDs are provided. The style object ID for a control class can be associated with one or more styles. In the illustrated example, style object IDs 308, 310, 358, and 360 are shown to be respectively associated with styles 304, 306, 354, and 356. It will be appreciated that only one style object ID can be associated with multiple different styles for a control class.

In the illustrated example, the style object IDs are unique IDs (i.e. class identifiers or CLSIDs) that are associated with and uniquely identify a particular version of a control object (such as one of control objects 200a, 200b of FIG. 2). That is, when a third party decides to provide code to manipulate a control that has been developed by a control developer, they will do so by defining a programming object (e.g. control objects 200a, 200b and style objects 205a, 205b) that implements the interface for the control as specified by the control developer, as well as providing data and methods or function calls for that programming object that provide the unique appearance and/or behavior. The style object IDs for each control class are associated with and reference the programming objects that are defined by these third parties. Thus, when a particular control is to be created in an application, software code that is executing on the system will locate the particular control class in the registry associated with the control by using the CLSID of the control class. Once the particular registry entry for the control class is located, the software code will ascertain which style has been selected. The software code will then look under the style entry in the registry to ascertain the style object ID (CLSID) of a style object that is associated with that control class. The software code will then use the style object ID to instantiate a version of a style object (e.g. style objects 205a, 205b). This instantiated style object contains data and methods or function calls that provide a unique appearance for the control. The instantiated object can be programmed to read any properties that are located in the registry. The instantiated object can now be utilized to provide the unique control for the UI.

Figure 4:
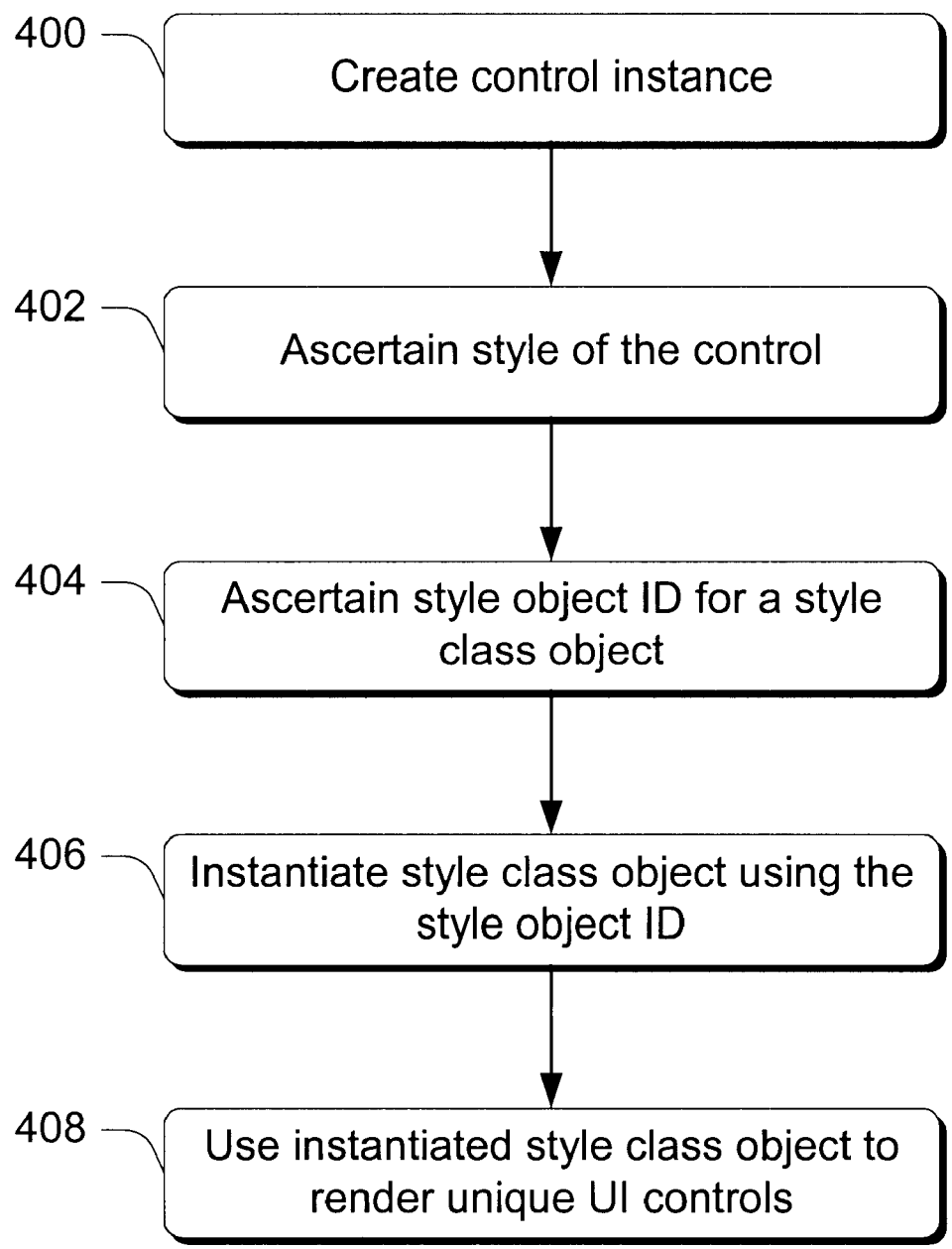
FIG. 4 is a flow diagram that describes steps in a method in accordance with one described embodiment.

FIG. 4 is a flow diagram that describes steps in a method in accordance with the described embodiment. The method of FIG. 4 can be implemented in any suitable hardware, software, firmware or combination thereof. In the illustrated example, the method is implemented by software executing on a computing device, such as the computing devices described above.

Step 400 creates a control instance. This step can be implemented by an application when it is initiated so that it will have the proper controls to display in the UI. Step 402 ascertains a style of the control. This step can be implemented by loading the style or it can be set by a developer. Step 404 ascertains a style object ID (i.e. CLSID) for a style class object that will be used to render the unique UI control. The style class object that is associated with the style object ID embodies software code that has been provided by a third party for the purpose of manipulating the appearance and/or behavior of a control that has been developed by a control developer. Once the style object ID has been ascertained, step 406 uses the style object ID to instantiate the associated style class object. Having instantiated the style class object, step 408 uses the instantiated style class object to render the unique UI controls for the user.

The methods and systems described above enable a control developer to initially design a control that is to be utilized in a computing device such as an embedded consumer device. The control developer does so by defining an interface for the control that is used to support certain functionality of the control. Third parties, such as OEM, can then provide their own software code in the form of programming objects that support the developer's defined interface. The programming objects can be utilized to manipulate the appearance and/or behavior of the control, subject to a constraint that the new programming objects support the interface that is defined by the control developer. Thus, in a sense, the control developer essentially develops a control platform that can then be manipulated by third parties to suit their own needs. For example, a control's appearance might be modified by inserting a company logo into each push button that might be selected by a user. The modified controls will persist across multiple applications that are capable of being executed on a single computing system so that consistency is enforced and the user experience is standardized. It will be appreciated that the inventive methods and systems unlock the potential for greatly varying controls to uniquely identify and position various products such as OEM products.

Themes

In another embodiment, flexibility for control manipulation is further enhanced through the use of so-called themes. A theme controls the overall appearance of a user's interface. A theme is a collection of appearances for each control class in the computing system.

Figure 5:
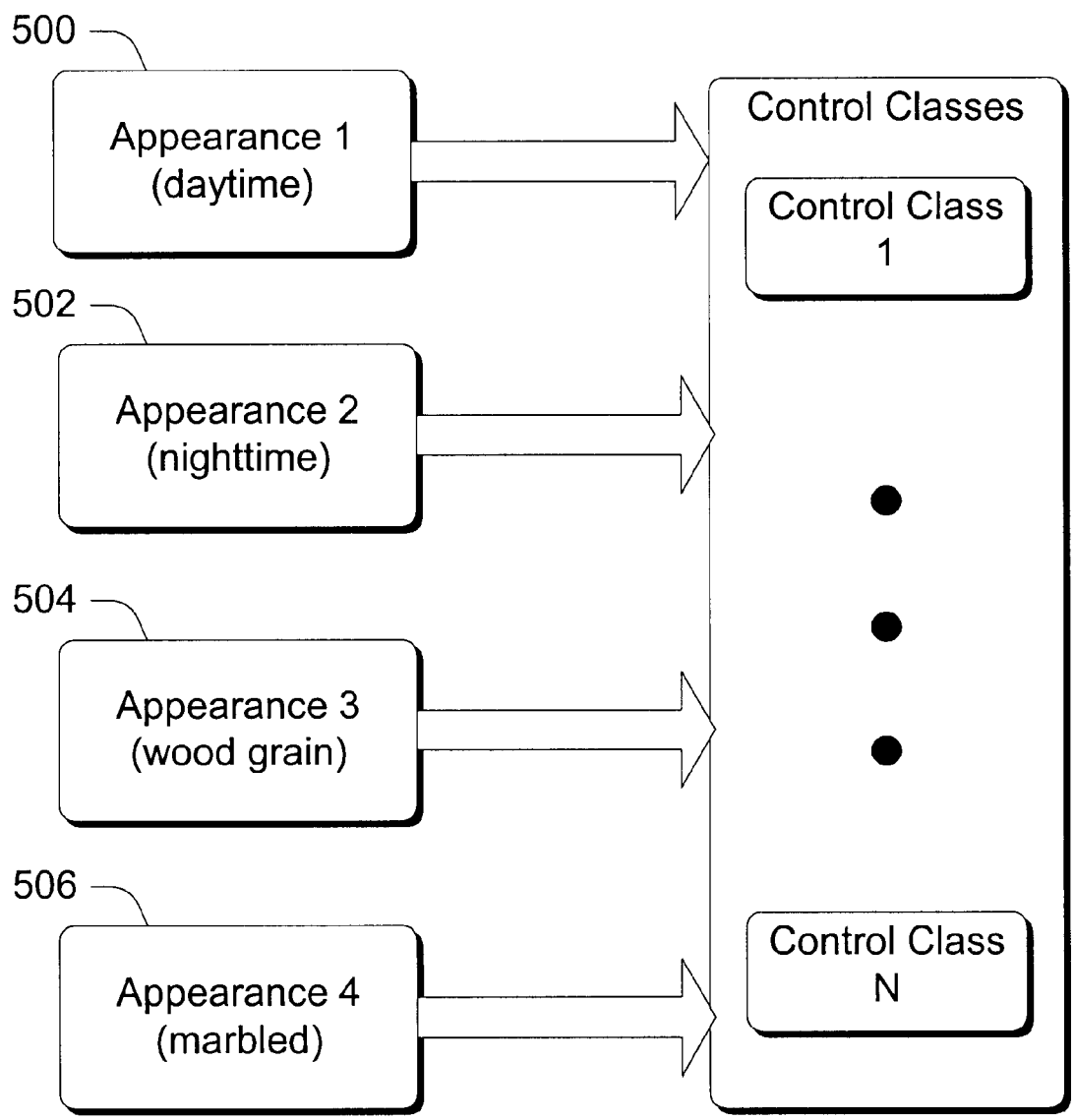
FIG. 5 is a block diagram that illustrates exemplary themes in accordance with one described embodiment.

FIG. 5 shows a high level view of how the various control classes in a computing system are affected by themes. Four exemplary themes 500, 502, 504, and 506 are shown. Theme 500 constitutes a daytime theme, theme 502 is a nighttime theme, theme 504 is a wood grain theme, and theme 506 is a marbled theme. Themes allow a system designer to group appearances that are graphically and aesthetically compatible such that when a theme is selected for use in the system, all controls will reflect the theme that has been selected. Thus, in the present example, if the current theme is selected to be the nighttime theme (theme 502), then all of the controls in the system, across all applications, will be presented so that they reflect the nighttime theme. An exemplary nighttime theme might consist of a particular selection of background and foreground colors that are somewhat more easy to distinguish at night.

Exemplary Organization Utilizing Themes

Figure 6:
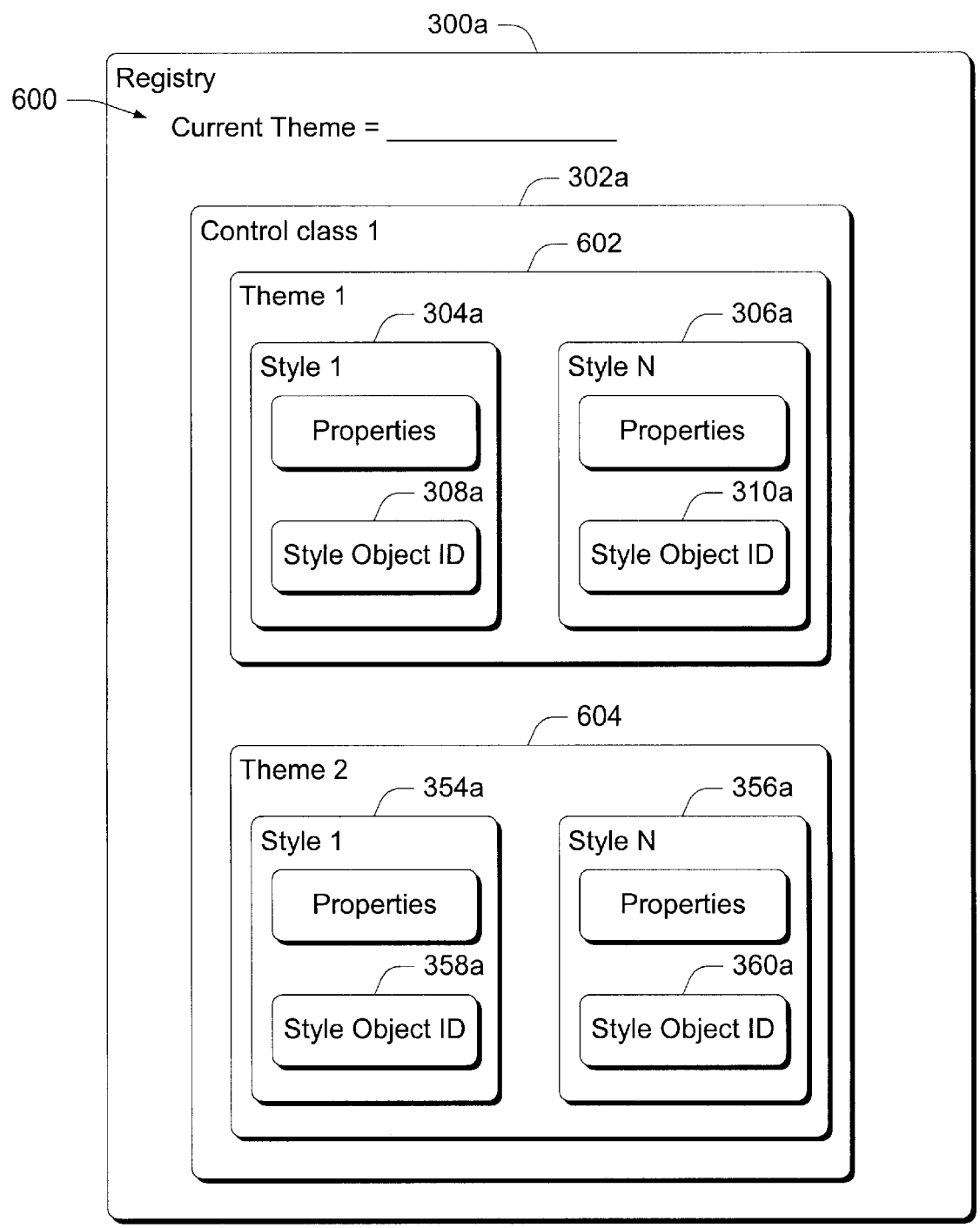
FIG. 6 is a high level block diagram of one exemplary organization in accordance with one described embodiment.

FIG. 6 presents an organization that is similar in some respects to the organization of FIG. 3 except that entries for the "current theme" have been added. The current theme entries make it possible to modify all of the controls in a system-wide manner so that all of the controls reflect the current theme. This means that any time a control is instantiated on the system where a current theme has been selected, it will be instantiated so that it conforms to the current theme. This is true for all of the controls that might be executed in connection with any application that is running on the system.

In the illustrated example, the organization of FIG. 6 is embodied in the system's registry 300a. In the registry, there is a current theme entry 600 that specifies the name of the current theme that is to be used by all controls in the system. As an example, consider a computing device in the form of a car stereo that is mounted in a car. During the daytime, it may be advantageous to have the controls presented in accordance with a particular color contrast, e.g. with colors that are easier to see during the day. At nighttime, however, it may be more advantageous to have the controls presented in accordance with a different color contrast so that it is easier to see. In this case, the car has a computing system that monitors for daytime and nighttime conditions and automatically changes the theme entry 600 so that the appropriate color-contrasted controls are presented to the driver of a vehicle. Monitoring for daytime and nighttime conditions can be as simple as monitoring for when the headlights are activated. Modification of the controls can advantageously take place at run time.

In this particular example, for each control class (only one control class 302a is shown) there are entries that are associated with each of the themes that can be selected. In the illustrated example, the theme entries are shown at 602, 604. Each theme can have one or more styles associated with it, with each style having properties and a style object ID. In the present example, theme 602 can have multiple styles, with exemplary styles being shown at 304a, 306a. Each of these styles has a respective style object 308a, 31 0a associated with it. Similarly, theme 604 can have multiple styles, with exemplary styles being shown at 354a, 356a. Each of these styles has a respective style object 358a, 360a associated with it.

When a control is instantiated, software code executing on the computing systems ascertains the current theme from the current theme entry 600. The control locates its control class (all controls know their control class) and opens and uses the key for the control class that corresponds to the current theme. In this case, if a current theme of "Theme 1" is set, then when a control associated with control class 302a is instantiated, software code locates the theme entry or key (i.e. theme 602) that corresponds to the current theme and uses it. Now, when a style for that control is set, the software code opens the style key, e.g. style 304a, and locates the style object ID 308a for that particular style. Recall that the style object ID holds the ID for the style class object that has been defined for that particular style and for that particular theme. The style entry or key 304a also contains all of the properties or parameters that are used by the style class object to control the appearance and behavior of the style class object. Thus, when a style class object is instantiated as described above, it renders its associated controls in the current theme that has been selected.

Changing the current theme entry 600 and resetting the system can change the overall appearance of the user interface. Additionally, widely varying user interfaces can be created while only adding minimal overhead to the system.

Figure 7:
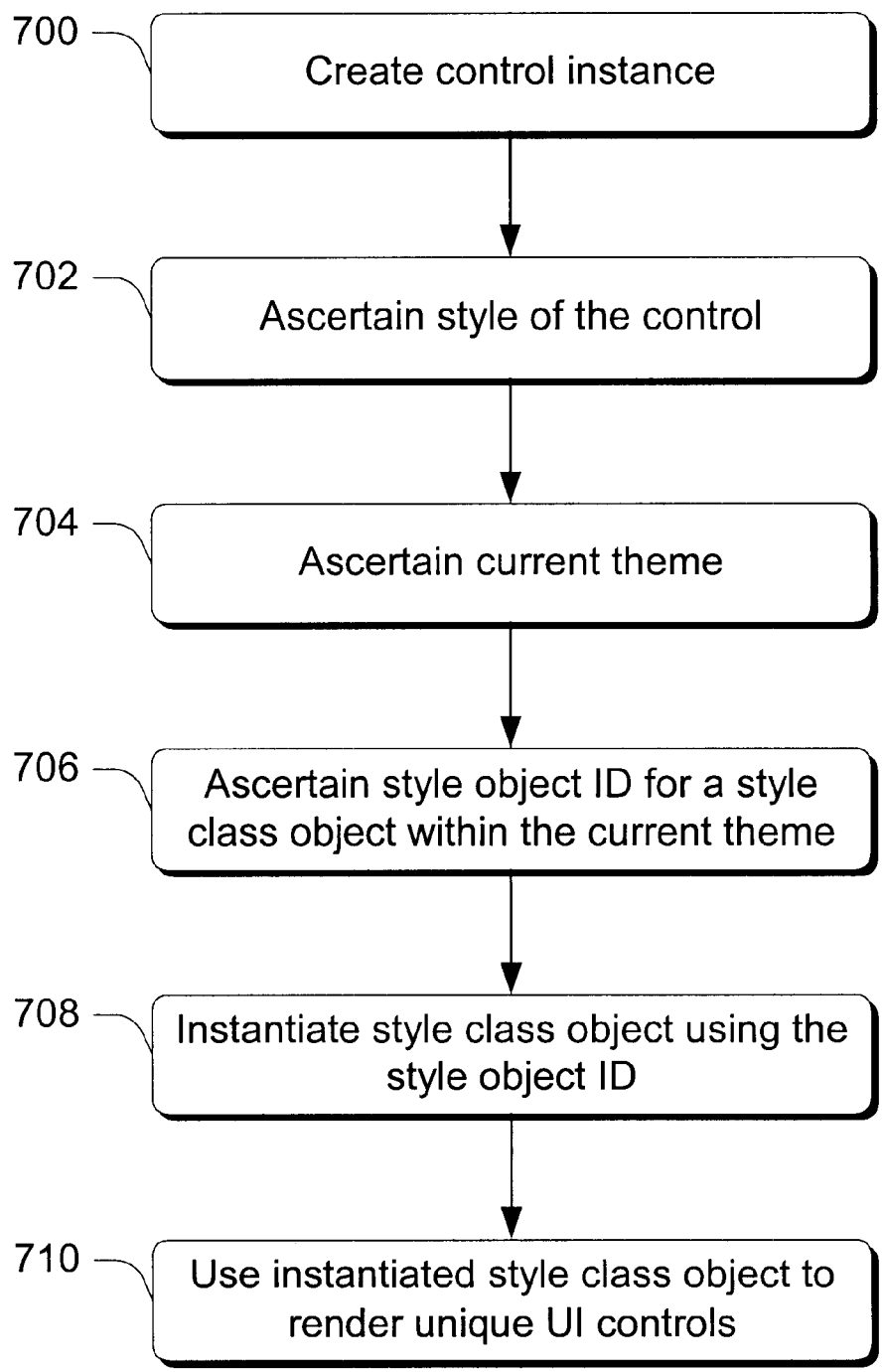
FIG. 7 is a flow diagram that describes steps in a method in accordance with one described embodiment.

FIG. 7 is a flow diagram that describes steps in a method in accordance with this described embodiment. The method of FIG. 7 can be implemented in any suitable hardware, software, firmware or combination thereof. In the illustrated example, the method is implemented by software executing on a computing device, such as the computing devices described above.

Step 700 creates a control instance. This step can be implemented by an application when it is initiated so that it will have the proper controls to display in the UI. Step 702 ascertains a style of the control. This step can be implemented by loading the style or it can be set by a developer. Step 704 ascertains the current theme that has been set. In the FIG. 6 example, the current theme is ascertained by reading the current theme entry 600. Once the current theme is ascertained, step 706 ascertains a style object ID (i.e. CLSID) for a style class object within the current theme. The style class object will be used to render the unique UI control having the current theme. The style class object that is associated with the style object ID embodies software code that has been provided by a third party for the purpose of manipulating the appearance and/or behavior of a control that has been developed by a control developer. Once the style object ID has been ascertained, step 708 uses the style object ID to instantiate the associated style class object. Having instantiated the style class object, step 710 uses the instantiated style class object to render the unique UI controls having the appropriate theme for the user.

Conclusion

The inventive methods and systems described above provide the capability of manipulating the appearance and/or behavior of system controls after the controls have been designed by a control designer. Manipulation can take place at run time which provides an added degree of flexibility that has not heretofore been possible. Control manipulation can take place automatically and persists across multiple applications that might be executing on a computing system thereby providing a standardized user experience. The inventive principles described herein are particularly well suited for enabling third parties, such as OEMs, to "brand" their products so that the UI and controls embodied on the products reflect a unique appearance and/or behavior that can serve as a basis for distinguishing the OEM's products from the products of others.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A computing system comprising:
   one or more processors;
   computer-readable media; and
   multiple applications stored on the computer-readable media and executable on the one or more processors;
   a registry comprising:
      multiple control classes each of which being associated with an individual control and having been developed by one or more original control developers;
      one or more styles associated with each of the control classes, the styles defining a particular type of control for the control class; and
      a style object ID associated with one or more of the styles, each style object ID identifying a programming object that can be instantiated to render a control having a particular style;
      at least one of said programming objects being provided by a third party other than an original control developer and being configured so that the associated one or more styles are not capable of being manipulated by an end user;
   individual applications being configured to render a user interface having one or more controls to permit user interaction with the application, each control having an original design that was imparted to the control when it was originally designed by one or more of the original control developers;
   the system being configured to render individual controls for a user so that the controls are different from their original design.

2. The computing system of claim 1, wherein the controls are modifiable.

3. The computing system of claim 1, wherein the controls are modifiable at run time.

4. The computing system of claim 1, wherein the controls are automatically modifiable.

5. The computing system of claim 1, wherein the controls are automatically modifiable at run time.

6. The computing system of claim 1, wherein the controls are modifiable so that individual control types are standardized across all applications.

7. The computing system of claim 1, wherein the controls are modifiable in appearance.

8. The computing system of claim 1, wherein the controls are modifiable in behavior.

9. The computing system of claim 1, wherein the controls are modifiable in both appearance and behavior.

10. The computing system of claim 1 embodied as an embedded product.

11. The computing system of claim 1 embodied as a consumer product.

12. The computing system of claim 1 embodied as an embedded consumer product.

13. The computing system of claim 1, wherein the system is configured with software code that defines one or more programming objects that are programmed to render individual controls so that they are different from their original design when rendered for a user.

14. The computing system of claim 1, wherein the controls are modifiable in connection with one or more themes, each theme being configured to modify the controls across all applications on the system that use the controls.

15. An embedded device comprising:

one or more processors;

computer-readable media configured to hold multiple applications that are executable on the one or more processors;

software code on the computer-readable media defining multiple programming objects, individual programming objects being associated with a user interface control that permits user interaction with one or more of the applications; and individual programming objects being programmed to render a user interface control that is different in one or more of its appearance and behavior than the user interface control as originally developed by a control developer, at least one of said programming objects being provided by a third party other than an original control developer and being configured so that the appearance of an associated control is not capable of being manipulated by an end user.

16. The embedded device of claim 15, wherein the device is configured that individual control types are standardized in appearance and behavior when rendered across multiple applications.

17. The embedded device of claim 15, wherein the controls are modifiable.

18. The embedded device of claim 15, wherein the controls are modifiable at run time.

19. The embedded device of claim 15, wherein the controls are automatically modifiable.

20. The embedded device of claim 15, wherein the controls are modifiable in connection with multiple themes, each theme being configured to modify the controls across all applications that use the controls.

21. A computerized consumer product comprising;

one or more processors configured to render a user interface comprising one or more controls that permit user interaction with one or more applications;

a registry comprising:

multiple control classes each of which being associated with an individual control and having been developed by one or more original control developers;

one or more styles associated with each of the control classes, the styles defining a particular type of control for the control class; and a style object ID associated with one or more of the styles, each style object ID identifying a programming object that can be instantiated to render a control having a particular style, at least one of said programming objects being provided by a third party other than an original control developer and being configured so that the associated one or more styles are not capable of being manipulated by an end user.

22. The computerized consumer product of claim 21, wherein the programming object is configured to render a control that is different in appearance from the control as originally developed by a control developer.

23. The computerized consumer product of claim 21, wherein the programming object is configured to render a control that is different in behavior from the control as originally developed by a control developer.

24. The computerized consumer product of claim 21, wherein the programming object is configured to render a control that is different in appearance and behavior from the control as originally developed by a control developer.

25. The computerized consumer product of claim 21, wherein the registry further comprises one or more themes that can be utilized to change the appearance of a control across multiple applications.

26. A computerized consumer product comprising:

one or more processors configured to render a user interface comprising one or more controls that permit user interaction with one or more applications;

a registry comprising:

multiple control classes each of which being associated with an individual control developed by one or more original control developers;

one or more styles associated with each of the control classes, the styles defining a particular type of control for the control class;

a style object ID associated with one or more of the styles, each style object ID identify a programming object that can be instantiated to render a control having a particular style, the programming object being configured to render a control that is different in appearance from the control as originally developed by a control developer, at least one of said programming objects being provided by a third party other than the one or more original control developers and being configured so that the associated one or more styles are not capable of being manipulated by a user; and one or more themes that can be utilized to change the appearance of a control across multiple applications.

27. A computer-readable medium embodying an organization of data that contains references to programming objects that can be instantiated and used to render unique user interface controls that permit a user to interact with multiple applications, the rendered unique user interface controls being different in one or more of their appearance and behavior from controls that were originally developed by a control developer, at least some of said programming objects being provided by a third party other than an original control developer who developed a control and being configured so that the appearance of the control is not capable of being manipulated by a user.

28. The computer-readable medium of claim 27, wherein the organization of data is embodied in a system registry of a computing device.

29. The computer-readable medium of claim 27, wherein individual programming objects render respective controls that are standard across the multiple applications.

30. The computer-readable medium of claim 27, wherein the organization of data comprises multiple control classes each of which being associated with an individual control, individual references being associated with individual control classes.

31. The computer-readable medium of claim 27, wherein the organization of data comprises:
   multiple control classes each of which being associated with an individual control, individual references being associated with individual control classes; and
   one or more styles associated with each of the control classes, the styles defining a particular type of control for the control class.

32. The computer-readable medium of claim 27, wherein the organization of data comprises multiple themes, each theme being configured to modify the appearance and/or behavior of multiple controls in a standardized way across multiple applications.

33. A method of providing one or more user interface controls comprising:
   defining one or more programming objects that are programmed to manipulate the appearance and/or behavior of a user interface control that has been developed by an original control developer, at least one of said programming objects being provided by a third party other than an original control developer and being configured so that the appearance of an associated control is not capable of being manipulated by an end user; and
   associating an identifier with the one or more programming objects so that the one or more programming objects can be instantiated and used to provide a user interface control.

34. The method of claim 33, wherein the one or more programming objects support a developer-specified interface.

35. The method of claim 33, wherein the one or more programming objects comprise COM objects.

36. The method of claim 33, wherein the one or more programming objects are configured to manipulate the appearance and/or behavior of the user interface control at run time.

37. The method of claim 33, wherein the one or more programming objects are configured to automatically manipulate the appearance and/or behavior of the user interface control.

38. The method of claim 33, wherein said act of defining is performed by a third party other than the control developer.

39. The method of claim 33, wherein said act of defining is performed by a third party original equipment manufacturer.

40. A method of providing one or more user interface controls comprising:

providing a computing system; and
storing one or more references to one or more programming objects at a location in the computing system, the one or more programming objects being configured to modify the appearance of multiple user interface controls so that user interface controls that are presented to a user of the system are different in appearance from user interface controls that were originally developed by a control developer, at least one of said programming objects being provided by a third party other than an original control developer and being configured so that the appearance of an associated control is not capable of being manipulated by an end user.

41. The method of claim 40 further comprising using one or more of the programming objects to modify the appearance of a user interface control.

42. The method of claim 40, wherein the location is a system registry for the computing system.

43. The method of claim 42, wherein the computing system comprises an embedded device.

44. The method of claim 42, wherein the computing system comprises consumer device.

45. The method of claim 40, wherein the computing system is configured so that the one or more programming objects modify the appearance of the multiple user interface controls across multiple applications, individual user interface controls being modified so that each has a standard appearance across the multiple applications.

46. The method of claim 40 further comprising storing multiple references to different themes at the location, each theme being configured to change the appearance of multiple user interface controls across the computing system.

47. A method of presenting a user interface control comprising:
   ascertaining a style of a user interface control that is to be presented to a user of a computing system so that the user can interact with one or more applications on the computing system;
   ascertaining a style object ID for a style class object that will be used to render the user interface control having the ascertained style;
   instantiating a style class object that is associated with the style object ID, the style class object embodying code that has been provided by a third party other than a control developer who developed the user interface control, the code being configured to manipulate the appearance and/or behavior of the control and not permit an end user to manipulate the appearance and/or behavior of the control; and
   rendering a user interface control using the instantiated style class object.

48. The method of claim 47, wherein the code is configured to manipulate the appearance and/or behavior of the control at run time.

49. The method of claim 47, wherein the computing system comprises an embedded device.

50. The method of claim 47, wherein the third party comprises an original equipment manufacturer (OEM).

51. One or more computer-readable media having computer-readable instructions thereon which, when executed by a computing system, cause the computing system to:
   ascertain a style of a user interface control that is to be presented to a user of a computing system so that the user can interact with one or more applications on the computing system;

ascertain a style object ID for a style class object that will be used to render the user interface control having the ascertained style;

instantiate a style class object that is associated with the style object ID, the style class object embodying code that is configured to manipulate the appearance and/or behavior of a user interface control so that the appearance and/or behavior is different from an appearance and/or behavior that was specified for the control when the control was initially developed by a control developer, the code further being configured to not permit an end user to manipulate the appearance and/or behavior of a control whose appearance and/or behavior are different; and render a user interface control using the instantiated style class object.

52. The computer-readable media of claim 51, wherein the instructions cause the computing system to render the user interface control so that its appearance and/or behavior is standard across multiple applications.

53. A method of presenting a user interface control comprising:

ascertaining a style of a user control that is to be presented to a user of a computing system so that the user can interact with multiple applications on the computing system;

ascertaining a current theme for the system, the current theme defining an appearance of multiple controls across the system;

ascertaining a style object ID for a style class object that will be used to render the user interface control having the ascertained style;

instantiating the style class object that is associated with the style object ID, said style class object being provided by a third party other than an original control designer and being configured to brand an associated control;

rendering the user interface control using the instantiated style class object, the rendered control having an appearance that is specified by the current theme.

54. The method of claim 53 further comprising automatically changing the current theme.

55. One or more computer-readable media having computer-readable instructions thereon which, when executed by a computing system, cause the computing system to implement the method of claim 53.

56. A computing system that contains software code that implements the method of claim 53.

57. An embedded consumer computing system that contains software code that implements the method of claim 53.

58. A computing system comprising:

one or more processors;

computer-readable media; and multiple applications stored on the computer-readable media and executable on the one or more processors;

individual applications being configured to render a user interface having one or more controls to permit user interaction with the application, each control having an original design that was imparted to the control when it was originally designed; and means for rendering branded individual controls for a user so that the controls are different from their original design, said means for rendering branded individual controls permitting a third party other than an original control developer to brand the individual controls.

59. The computing system of claim 58, wherein the controls are modifiable.

60. The computing system of claim 58, wherein the controls are modifiable at run time.

61. The computing system of claim 58, wherein the controls are automatically modifiable.

62. The computing system of claim 58, wherein the controls are automatically modifiable at run time.

63. The computing system of claim 58, wherein the controls are modifiable so that individual control types are standardized across all applications.

64. The computing system of claim 58, wherein the controls are modifiable in appearance.

65. The computing system of claim 58, wherein the controls are modifiable in behavior.

66. The computing system of claim 58, wherein the controls are modifiable in both appearance and behavior.

67. The computing system of claim 58 embodied as an embedded product.

68. The computing system of claim 58 embodied as a consumer product.

69. The computing system of claim 58 embodied as an embedded consumer product.

70. The computing system of claim 58, wherein said means comprises software code that defines one or more programming objects that are programmed to render individual controls so that they are different from their original design when rendered for a user.

71. The computing system of claim 58, wherein the controls are modifiable in connection with one or more themes, each theme being configured to modify the controls across all applications on the system that use the controls.

72. An embedded device comprising:

one or more processors;

computer-readable media configured to hold multiple applications that are executable on the one or more processors;

software code on the computer-readable media defining multiple programming objects, individual programming objects being associated with a user interface control that permits user interaction with one or more of the applications; and individual programming objects being programmed to render a user interface control that is different in one or more of its appearance and behavior than the user interface control as originally developed by a control developer, at least one of said programming objects being provided by a third party other tan an original control developer and being configured to brand an associated control.

73. The embedded device of claim 72, wherein the device is configured so that individual control types are standardized in appearance and behavior when rendered across multiple applications.

74. The embedded device of claim 72, wherein the controls are modifiable.

75. The embedded device of claim 72, wherein the controls are modifiable at run time.

76. The embedded device of claim 72, wherein the controls are automatically modifiable.

77. The embedded device of claim 72, wherein the controls are modifiable in connection with multiple themes, each theme being configured to modify the controls across all applications that use the controls.

78. A computerized consumer product comprising:

one or more processors configured to render a user interface comprising one or more controls that permit user interaction with one or more applications;

a registry comprising:

multiple control classes each of which being associated with an individual control and having been developed by one or more original control developers;

one or more styles associated with each of the control classes, the styles defining a particular type of control for the control class; and a style object ID associated with one or more of the styles, each style object ID identifying a programming object that can be instantiated to render a control having a particular style, at least one of said programming objects being provided by an original equipment manufacturer that is different from the one or more original control developers and being configured to brand an associated control.

79. The computerized consumer product of claim 78, wherein the programming object is configured to render a control that is different in appearance from the control as originally developed by a control developer.

80. The computerized consumer product of claim 78, wherein the programming object is configured to render a control that is different in behavior from the control as originally developed by a control developer.

81. The computerized consumer product of claim 78, wherein the to programming object is configured to render a control that is different in appearance and behavior from the control as originally developed by a control developer.

82. The computerized consumer product of claim 78, wherein the registry further comprises one or more themes that can be utilized to change the appearance of a control across multiple applications.

83. A method of providing one or more user interface controls comprising:

defining one or more programming objects that are programmed to manipulate the appearance and/or behavior of a user interface control that has been developed by an original control developer, at least one of said programming objects being provided by a third party other than an original control developer and being configured to brand an associated control; and associating an identifier with the one or more programming objects so that the one or more programming objects can be instantiated and used to provide a user interface control.

84. The method of claim 83, wherein the one or more programming objects support a developer-specified interface.

85. The method of claim 83, wherein the one or more programming objects comprise COM objects.

86. The method of claim 83, wherein the one or more programming objects are configured to manipulate the appearance and/or behavior of the user interface control at run time.

87. The method of claim 83, wherein the one or more programming objects are configured to automatically manipulate the appearance and/or behavior of the user interface control.

88. A method of providing one or more user interface controls comprising:

providing a computing system; and storing one or more references to one or more programming objects at a location in the computing system, the one or more programming objects being configured to modify the appearance of multiple user interface controls so that user interface controls that are presented to a user of the system are different in appearance from user interface controls that were originally developed by a control developer, at least one of said programming objects being provided by a third party other than an original control developer and being configured to brand an associated control.

89. The method of claim 88 further comprising using one or more of the programming objects to modify the appearance of a user interface control.

90. The method of claim 88, wherein the location is a system registry for the computing system.

91. The method of claim 88, wherein the computing system comprises an embedded device.

92. The method of claim 88, wherein the computing system comprises consumer device.

93. The method of claim 88, wherein the computing system is configured so that the one or more programming objects modify the appearance of the multiple user interface controls across multiple applications, individual user interface controls being modified so that each has a standard appearance across the multiple applications.

94. The method of claim 88 further comprising storing multiple references to different themes at the location, each theme being configured to change the appearance of multiple user interface controls across the computing system.

95. A method of presenting a user interface control comprising:

ascertaining a style of a user interface control that is to be presented to a user of a computing system so that the user can interact with one or more applications on the computing system;

ascertaining a style object ID for a style class object that will be used to render the user interface control having the ascertained style;

instantiating a style class object that is associated with the style object ID, the style class object embodying code that has been provided by a third party other than a control developer who developed the user interface control, the code being configured to manipulate the appearance and/or behavior of the control and to permit branding of the control by the third party; and rendering a user interface control using the instantiated style class object.

96. The method of claim 95, wherein the code is configured to manipulate the appearance and/or behavior of the control at run time.

97. The method of claim 95, wherein the computing system comprises an embedded device.

98. The method of claim 95, wherein the third party comprises an original equipment manufacturer (OEM).

* * * * *

UNITED STATES PATENT AND TRADEMARK OFFICE
CERTIFICATE OF CORRECTION

PATENT NO. : 6,677,962 B1  Page 1 of 1
DATED : January 13, 2004
INVENTOR(S) : Bailey It is certified that error appears in the above-identified patent and that said Letters Patent is hereby corrected as shown below:

<u>Column 13,</u>
Line 54, insert -- so -- between "configured" and "that".

<u>Column 14,</u>
Line 48, replace "identify" with -- identifying --.

<u>Column 18,</u>
Line 50, replace "tan" with -- than --.

<u>Column 19,</u>
Line 29, delete "to" between "the" and "programming".

Signed and Sealed this

Fifteenth Day of June, 2004

JON W. DUDAS
*Acting Director of the United States Patent and Trademark Office*